March 17, 1931.  F. LONGOBARDI  1,796,952
VEHICLE WHEEL
Filed June 15, 1929
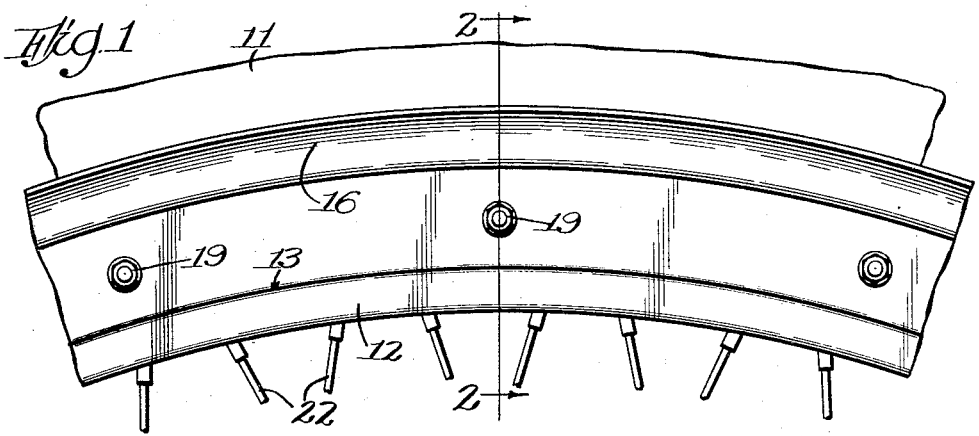
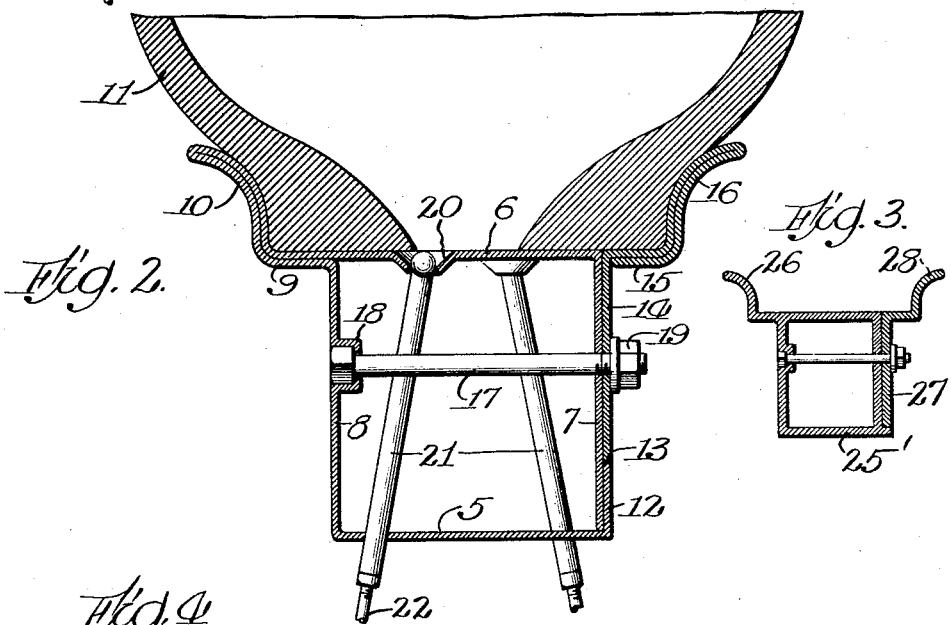
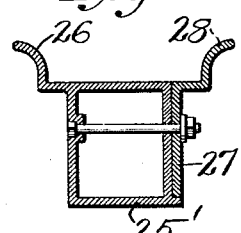
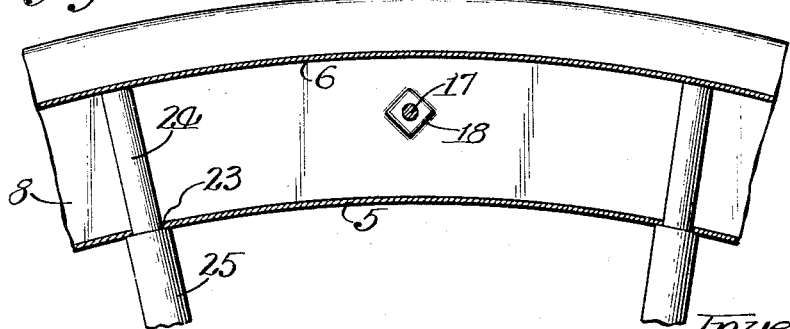
Inventor:
Felice Longobardi
By Glenn S. Noble Atty.

Patented Mar. 17, 1931

1,796,952

UNITED STATES PATENT OFFICE

FELICE LONGOBARDI, OF CHICAGO, ILLINOIS

VEHICLE WHEEL

Application filed June 15, 1929. Serial No. 371,180.

This invention relates particularly to vehicle wheels for use with pneumatic tires as for automobiles, trucks or the like. The objects of this invention are to provide an improved vehicle wheel which will be light in construction and which will be strong and durable in use; to provide a rim which is constructed so that the tire may be readily applied or removed; to provide a combined rim and felloe formed of two pieces only; to provide a combined rim and felloe formed of sheet metal or casting; and to provide such other desirable features and improvements in a device of this kind as will appear from the following description.

In the accompanying drawings illustrating this invention,

Figure 1 is a side view of a portion of a wheel embodying the same;

Figure 2 is a sectional view taken on the line 2—2 of Figure 1 but shown on an enlarged scale;

Figure 3 is a sectional view showing a modied form of rim; and

Figure 4 is a longitudinal sectional view showing the rim with wooden spokes.

Figures 1 and 2 illustrate a wire spoked wheel with the rim and felloe formed of sheet metal. The felloe is substantially rectangular in cross section having an inner peripheral rim or wall 5 and an outer wall 6 with sides 7 and 8. The rim or tread portion 6 preferably extends beyond the side 8, thereby forming a lateral projecting flange 9 of double thickness, the folded metal being continued outwardly and laterally to form a bead or flange 10 for engagement with the bead or side of the tire 11. The edge 12 of the inner rim or wall 5 extends outwardly to form a shoulder 13 and overlaps a portion of the side wall 7, these overlapping portions being preferably welded or otherwise fastened together to make a substantially integral structure.

A ring or disk 14 engages with the side wall 7 and fits against the shoulder 13. The metal forming the disk is bent laterally to form a flange 15 which corresponds with the flange 9, and the folded metal is continued outwardly to make a bead or curved flange 16 which coacts with the flange 10 in holding the tire on the rim.

The ring or band 14 is secured to the felloe by means of bolts 17. The heads of these bolts preferably fit in recesses 18 in the wall 8 which prevent their turning, and the ring is held by nuts 19. The bolts may be welded or otherwise secured to the wheel to prevent their displacement so that the nuts may be readily turned off or on in order to remove or replace the ring.

Depressions 20 are formed in the rim 6 for the heads of the nipples or end sections 21 of the wire spokes 22. These nipples extend inwardly through the inner wall or rim 5 and if desired may be welded or otherwise fixed to the rim.

Figure 4 shows the same rim construction as used with wheels having wooden spokes. In this arrangement the inner rim 5 is provided with holes 23 for the reduced ends 24 of the spokes 25. The ends of the spokes preferably abut against the outer rim 6, thereby taking the strain off from the felloe. This provides a substantial and secure fastening for the rim on the spokes, thereby making a particularly strong wheel structure.

From this description it will be seen that I provide a rim and felloe construction which may be made very light but which is also rigid, particularly when the parts are braced by the nipples or ends of the spokes.

The rim and felloe parts may be formed of any suitable blanks, either circular or disc-like, or straight strips. If formed of straight strips, the ends may be brought together and butt welded or otherwise secured in order to complete the circular formation.

In the modified form of construction shown in Figure 3 the felloe 25' with the outer rim and the flange 26 are all formed of somewhat thicker metal without folding, and the ring 27 and its flange or bead 28 are formed of another piece without being folded. This form may be built up if desired or the parts may be cast or otherwise fabricated in any suitable manner.

In view of the various types of wheels, it is apparent that my improved structure may be made in various forms in order to be adapted for different conditions and changes may be made in the details of construction without departing from the scope of the invention as set forth in the following claim in which

I claim:

A new article of manufacture comprising a combined felloe and rim formed of two pieces of sheet metal, one of said pieces being shaped to provide inner and outer annular walls with radial side walls and with a laterally projecting folded flange section, the edges of the piece of metal being overlapped at one of the sides to provide a shoulder, the other piece being shaped to provide an annular ring adapted to engage with the shoulder and side of the felloe portion and having a folded flange section and means for fastening the pieces together substantially as described.

FELICE LONGOBARDI.